Figure 1:
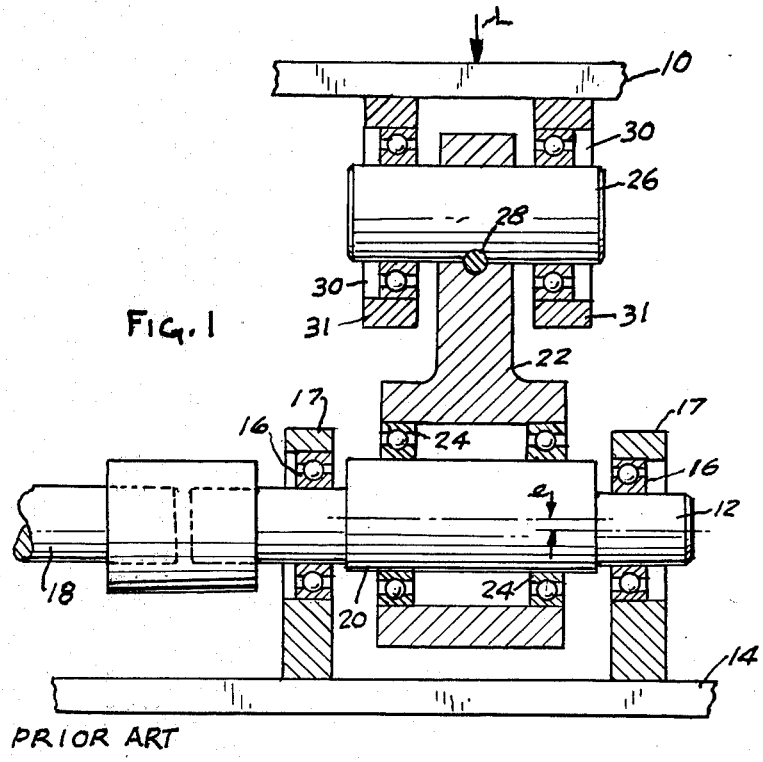

United States Patent [19]

Bonzack

[11] 4,334,436

[45] Jun. 15, 1982

[54] BEARING ARRANGEMENT FOR OSCILLATING SHAFTS

[75] Inventor: Eugene P. Bonzack, Livonia, Mich.

[73] Assignee: F. Jos. Lamb Company, Warren, Mich.

[21] Appl. No.: 180,125

[22] Filed: Aug. 21, 1980

[51] Int. Cl.³ .................. F16H 21/22; F16H 57/04
[52] U.S. Cl. .................................... 74/44; 74/467
[58] Field of Search .......... 74/44, 467, 570, 579 R, 74/579 E, 595, 605; 184/6.5, 6.19

[56] References Cited

U.S. PATENT DOCUMENTS 684,819 10/1901 Henderson .................. 74/579 R
2,652,728 9/1953 Kiekhaefer .................. 74/579 E

FOREIGN PATENT DOCUMENTS 190740 7/1957 Austria .......................... 74/605

Primary Examiner—Lawrence J. Staab
Attorney, Agent, or Firm—Barnes, Kisselle, Raisch & Choate

[57] ABSTRACT

A static load is reciprocated vertically by a crankshaft connected to the load by a wrist pin at one end of a connecting rod. Bearings are interposed between the wrist pin and the load and also between the wrist pin and the connecting rod. The wrist pin is rotated about its central axis by a chain drive from the crankshaft.

7 Claims, 2 Drawing Figures

BEARING ARRANGEMENT FOR OSCILLATING SHAFTS

This invention relates to a bearing arrangement for oscillating shafts which are subjected to a unidirectional radial load. More specifically, the invention relates to a bearing arrangement for a connecting rod that oscillates a heavy load vertically a relatively short distance proportional to the eccentricity of the crankshaft to which the connecting rod is connected.

In many types of devices a heavy load is reciprocated vertically through a short stroke by means of a crankshaft supported by bearings. The crankshaft is connected to the load by means of a connecting rod. The end of the connecting rod opposite the crank has a wrist pin which supports the load vertically by bearings interposed between the wrist pin and the load. In such an arrangement where the connecting rod is oscillated through a relatively small arc, usually less than about 10°, the bearings at the wrist pin frequently fail when highly loaded.

In highly loaded shaft bearings a certain degree of rotation is required to carry the lubricant from the area of bearing clearance into the area of high loading. When such highly loaded bearings are merely oscillated through a small arcuate extent, as distinguished from being rotated, the bearing lubricant is squeezed out from between the highly loaded bearing surfaces and is not replaced. Without lubrication the bearings will soon wear to destruction. This phenomenon is not limited merely to plain bearings; even anti-friction bearings having rolling elements when heavily loaded require enough rotation to carry the lubricant into the contact area between the rolling members and the races. In the absence of lubrication between any two metals, any slight relative movement will soon disintegrate one or both of the metal surfaces. This is true even when an attempt is made to introduce lubrication under pressure between these oscillating members.

The primary object of the present invention is to overcome the problem of bearing failure in devices of the type described.

Another object of the present invention is to promote the flow of lubricant to the highly loaded areas of bearings which normally only oscillate through a small arcuate extent by superimposing a rotating motion on the oscillating motion of the bearings.

A more specific object of this invention is to provide in a device of the type described lubricated bearings between the wrist pin and the connecting rod and impart rotation to the bearings by means of a chain and sprocket drive from the crankshaft.

Figure 2:
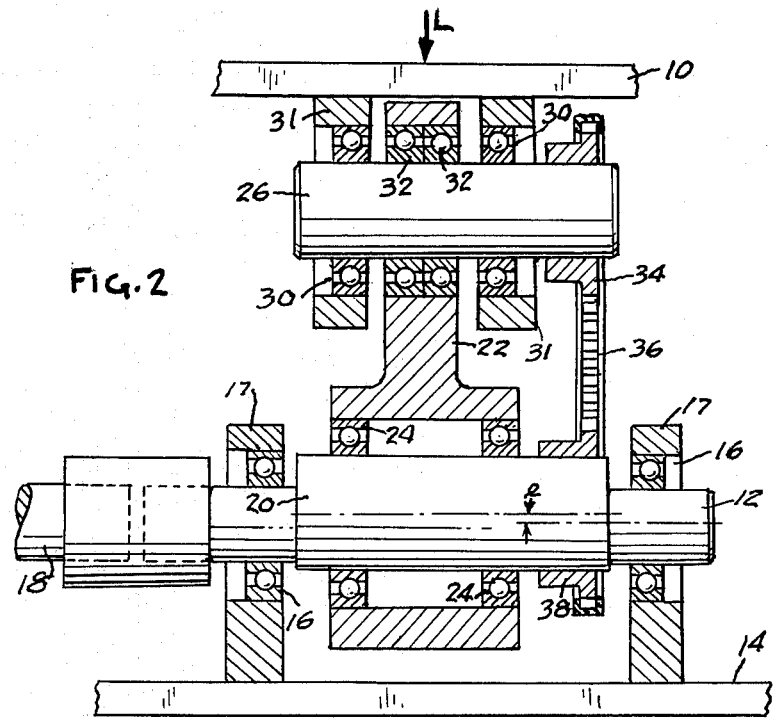

Other objects, features and advantages of the present invention will become apparent from the following description and accompanying drawing, in which:

FIG. 1 is a fragmentary sectional view of a crankshaft, wrist pin and bearing arrangement according to the prior art; and FIG. 2 is a fragmentary sectional view of a crankshaft, wrist pin and bearing arrangement according to the present invention.

In order to better understand the problem solved by the present invention there is illustrated in FIG. 1 one example of a prior art bearing arrangement which, over a period of time, results in bearing failure. Arrangements of the type shown in FIG. 1 are very common in the prior art. One such type of arrangement is employed in connection with helical storage and conveying units of the type, for example, disclosed in U.S. Pat. No. 4,026,409. Such storage and conveying units comprise two helically shaped guideways on which workpieces are adapted to be supported in a position inclined slightly to the vertical. One of the guideways is mounted on an outer cylindrical support and the other guideway is mounted on an inner cylindrical support having a diameter slightly less than the diameter of the outer cylindrical support. The inner cylindrical support is mounted on a base plate designated 10 in FIG. 1. The vertical load of the inner cylindrical support which is carried by base plate 10 is designated L. In such an arrangement the inner cylindrical support is reciprocated vertically through a short stroke to advance the workpieces in the direction of their inclination. In the arrangement illustrated in FIG. 1 the mechanism that reciprocates the base plate 10 comprises a crank shaft 12 supported upon a base 14 by two main bearings 16 in bearing blocks 17. Crankshaft 12 is normally coupled to the output shaft 18 of a motor-driven speed reducer (not illustrated).

The crank 20 of shaft 12 is connected to the lower end of a connecting rod 22 by bearings 24. A wrist pin 26 is fixedly connected to the upper end of connecting rod 22 by a pin 28. Wrist pin 26 in turn supports the load L on base plate 10 through bearings 30 in bearing blocks 31.

In the arrangement illustrated in FIG. 1 the small eccentricity e between crank 20 and shaft 12 causes wrist pin 26 to oscillate through a very small arc. Thus, the inner races of bearings 30 oscillate through only a very few degrees with respect to the outer races of these bearings. In such arrangements the wrist pin 26 normally oscillates through an arc of usually substantially less than 10°. Even though the load L does not exceed the recommended loading of bearings 30, in such arrangements bearings 30 frequently fail over a relatively short period of time because, as pointed out above, the inner and outer races of these bearings oscillate relative to one another only a few degrees. This causes the lubrication between the rolling members and the highly loaded race portions to be squeezed out and not replaced.

A bearing arrangement according to the present invention is shown in FIG. 2 in connection with a mechanism of the type illustrated in FIG. 1. Corresponding components of the mechanism are designated by the same numerals. As is clearly evident from a comparison of FIGS. 1 and 2, the primary differences between these two arrangements resides in the manner in which the wrist pin 26 is connected to the connecting rod 22. In the arrangement shown in FIG. 2 wrist pin 26 is supported within the upper end of connecting rod 22 by a pair of bearings 32. With this arrangement it is apparent that bearings 32 permit wrist pin 26 to rotate relative to connecting rod 22. At one end of wrist pin 26 there is secured a sprocket 34 connected by a chain 36 with a sprocket 38 on the crank 20 of shaft 12.

It will be observed that in the arrangement illustrated in FIG. 2 wrist pin 26 is rotated simultaneously with crankshaft 12. Thus, the inner races of bearings 30,32 are rotated continuously relative to the outer races of these bearings as long as the crankshaft 12 is rotated. Thus, even though the bearings 30,32 are subjected to a static vertical load, the continuous rotation of the inner races of these bearings relative to the outer races of these bearings permits the lubricant to circulate throughout the circumferential extent of the bearing races and failure of the bearings is avoided.

I claim:

1. In combination, a support, a rotatable shaft having a central axis, first lubricated bearing means journalling said shaft on said support for rotation about said central axis, an arm, second bearing means journalling one portion of said arm on said shaft for oscillation about the axis of the shaft, means applying a unidirectional radial load on said first and second bearing means, means for oscillating said arm about the axis of the shaft through an angle of substantially less than 180°, means for rotating said shaft while said arm is being oscillated, a second support, a second shaft spaced generally parallel to said first shaft, third bearing means journalling the second shaft on a second support, fourth bearing means journalling another portion of said arm on said second shaft, said arm transmitting said load to said third and fourth bearing means and means for rotating the second shaft while said arm is being oscillated.

2. The combination called for in claim 1 wherein said first and second shafts are operatively connected for rotation in unison.

3. The combination called for in claim 1 wherein said second shaft includes an eccentric crank, said other portion of said arm being journalled on said crank, said crank comprising the means for oscillating said arm on said first shaft.

4. A mechanism for vertically reciprocating a static load comprising, a base, a pair of co-axially aligned bearings on said base, said bearings being spaced apart laterally and having their axes extending generally horizontally, a crankshaft journalled in said bearings, means for rotating said crankshaft, said crankshaft having a crank portion extending between said bearings, a generally vertically extending connecting rod, bearing means journalling the lower end of said connecting rod on said crank portion, a wrist pin extending generally horizontally through the upper end of said connecting rod, bearing means journalling said wrist pin on the upper end of the connecting rod, a vertically loaded member disposed above the upper end of said connecting rod, said vertically loaded member having bearing block means thereon through which said wrist pin extends, bearing means journalling said wrist pin in said bearing block means and means for rotating said crankshaft and said wrist pin.

5. The mechanism called for in claim 4 wherein the means for rotating said wrist pin comprises a driving connection with said crankshaft.

6. The mechanism called for in claim 4 wherein the means for rotating said wrist pin comprises a driving connection with the crank portion of said crankshaft.

7. The mechanism called for in claim 4 wherein the means for rotating said wrist pin comprises a chain and sprocket drive between the wrist pin and the crank portion of the crankshaft.

* * * * *